No. 863,604. PATENTED AUG. 20, 1907.
J. A. HERZOG.
POWER DRIVEN VEHICLE.
APPLICATION FILED DEC. 7, 1906.

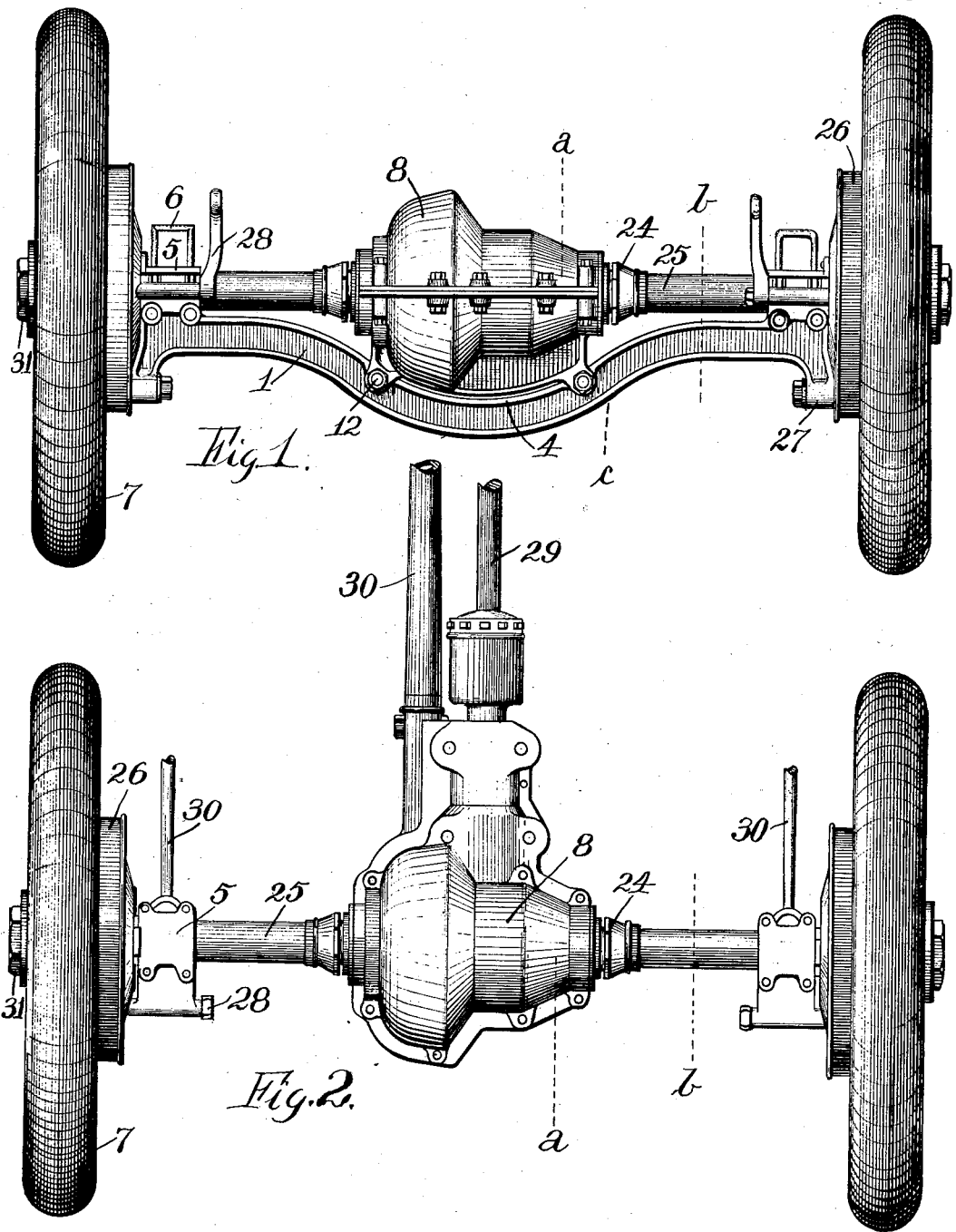

4 SHEETS—SHEET 2.

Witnesses:
Elmer R. Shipley
M. S. Belden.

John A. Herzog
Inventor
by James W. See
Attorney

Witnesses:
Elmer R. Shipley.
M. S. Belden.

John A. Herzog
Inventor
by James W. See
Attorney

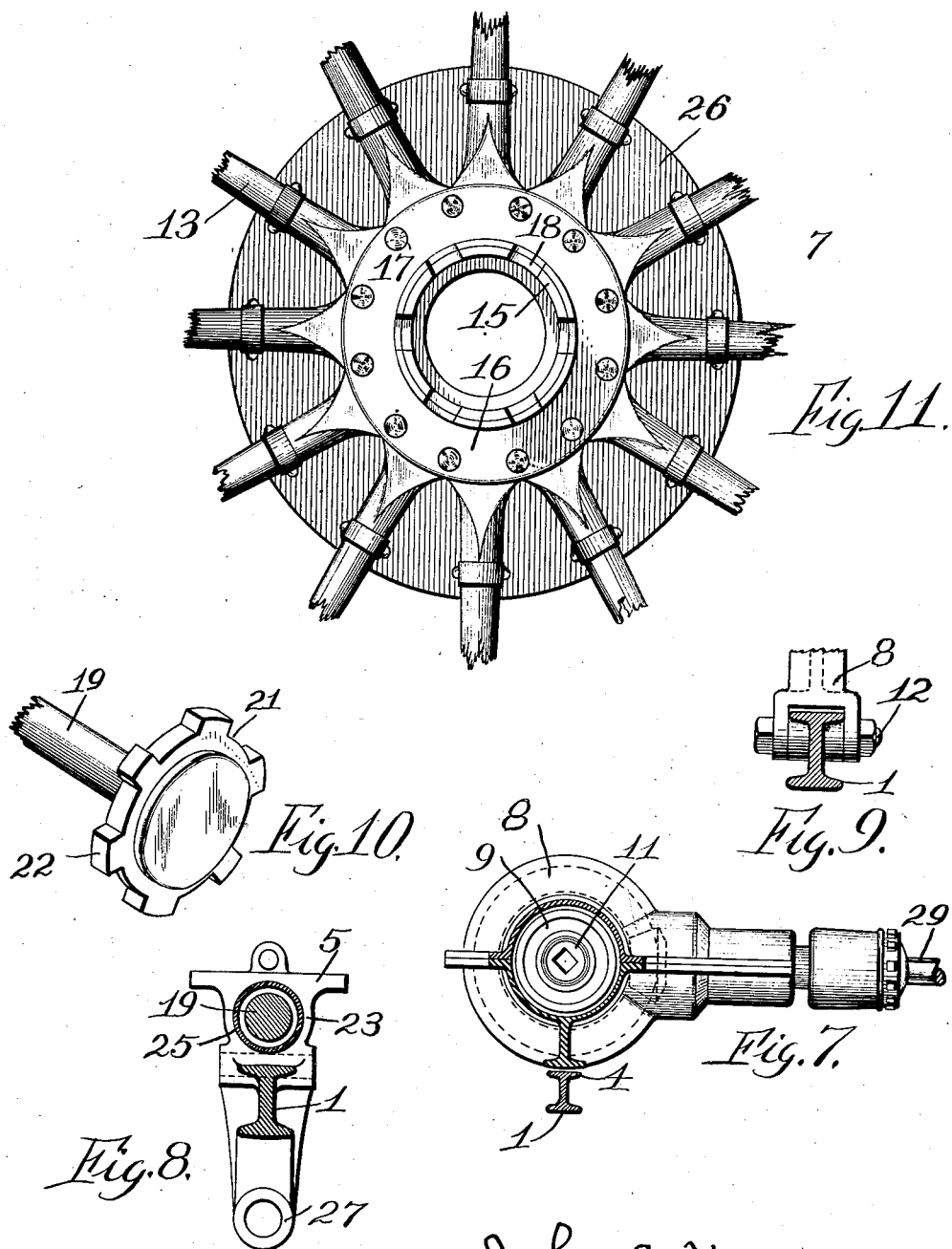

UNITED STATES PATENT OFFICE.

JOHN A. HERZOG, OF TOLEDO, OHIO, ASSIGNOR TO THE DE LUXE MOTOR CAR COMPANY, OF DETROIT, MICHIGAN.

POWER-DRIVEN VEHICLE.

No. 863,604.          Specification of Letters Patent.          Patented Aug. 20, 1907.

Application filed December 7, 1906. Serial No. 346,723.

*To all whom it may concern:*

Be it known that I, JOHN A. HERZOG, a citizen of the United States, residing at Toledo, Lucas county, Ohio, have invented certain new and useful Improvements in Power-Driven Vehicles, of which the following is a specification.

This invention pertains to improvements in the axle carrying the traction wheels of a power driven vehicle such, for instance, as an automobile, and relates to details of construction in that class of axles known as floating shaft axles, being axles in which the wheels turn loosely on axle-arms and have power transmitted to them by means of shafts extending freely through the axle arms.

While my improvements lend themselves to various systems of drives, such as chain drive, bevel geared shaft drive, &c., I have chosen to illustrate my invention as embodied in a driving system in which the traction wheels are driven through the medium of an equalizer having its axis coincident with that of the wheels and itself driven through the medium of a bevel geared power-shaft disposed at right angles to it.

The improvements will be readily understood from the following description taken in connection with the accompanying drawings in which:—

Figure 3:
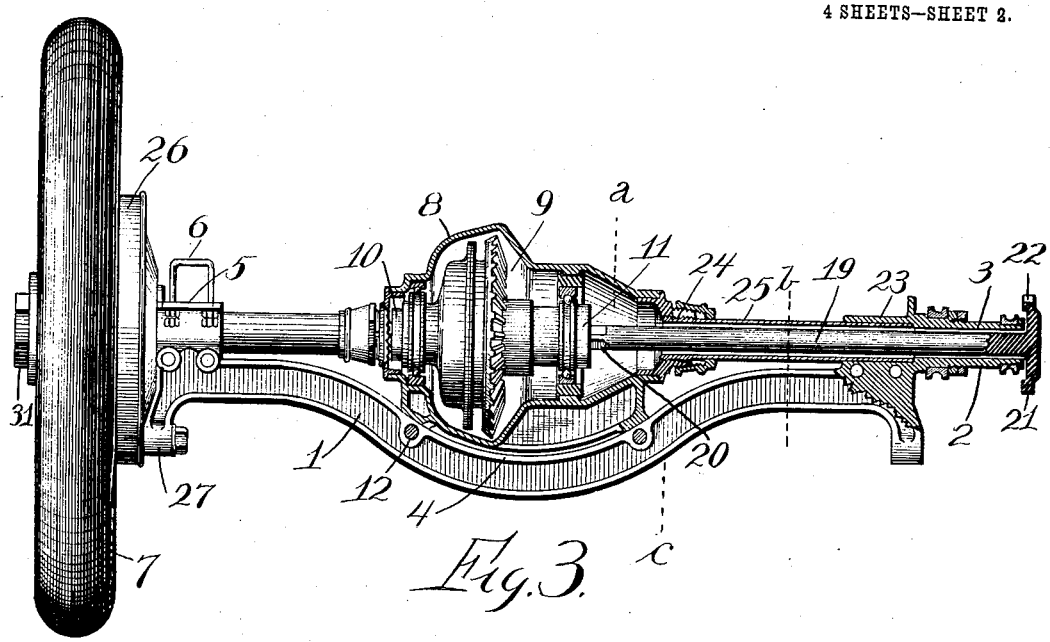
Figure 5:
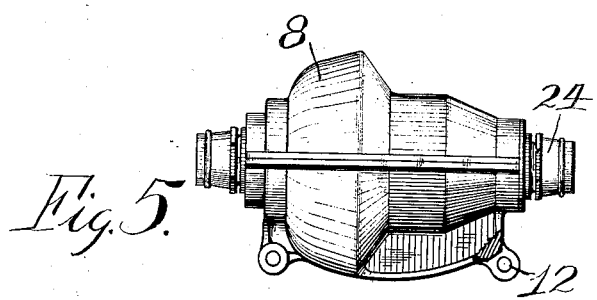
Figure 4:
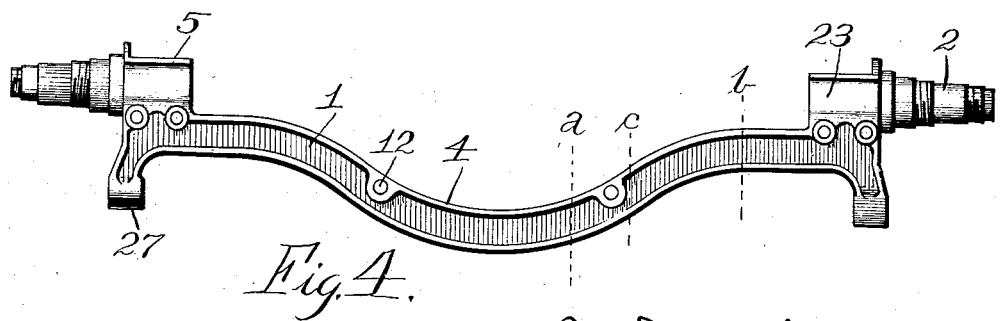
Figure 6:
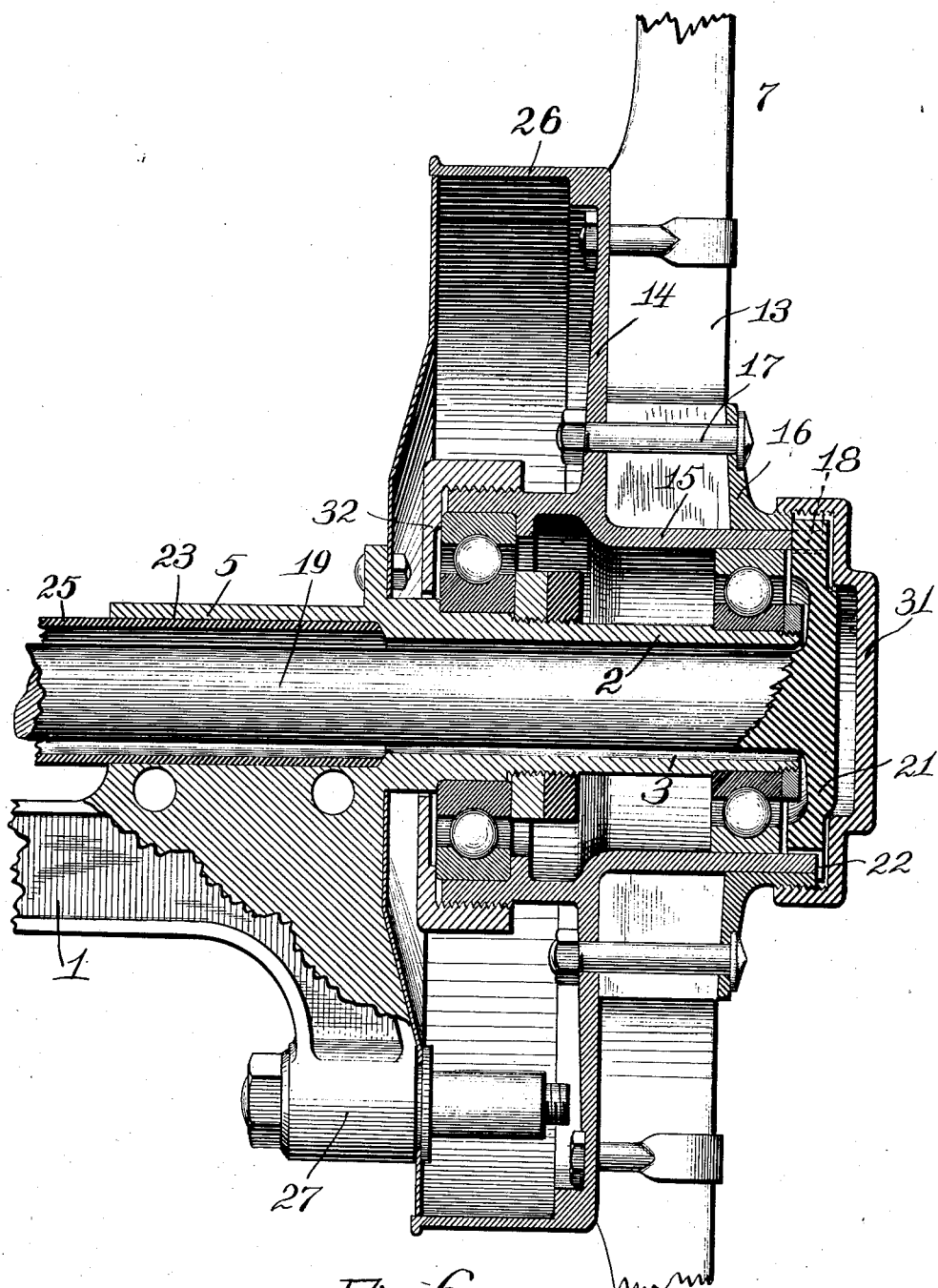

Figure 1 is a rear elevation of an axle embodying the principle of my invention in the best form in which I at present contemplate applying that principle. Fig. 2 a plan of the same. Fig. 3 a rear elevation partly in vertical horizontal section: Fig. 4 a rear elevation of the axle beam: Fig. 5 a rear elevation of the equalizer case. Fig. 6 a vertical longitudinal section, on an enlarged scale, of one of the axle-arms in conjunction with its traction wheel. Fig. 7 a transverse section of the axle in the plane of line *a* of other figures: Fig. 8 a similar section in the plane of line *b*. Fig. 9 a similar section in the plane of line *c*. Fig. 10 a perspective view of the outer end of one of the coupling shafts: and Fig. 11 an elevation of the outer face of the hub of one of the traction wheels.

In the drawings:—1, indicates the axle beam, a rigid structure illustrated as being of I-beam section, of a general length corresponding with the distance between the inner ends of the hubs of the traction wheels: 2, the axle-arms integrally formed on the ends of the beam, these arms being adapted to receive the traction wheel to run loosely upon them, the axis of the axle-arms being disposed above the beam: 3, bores extending entirely through the axle arms: 4, a curved depression at the central portion of the beam so as to carry that portion of the beam a considerable distance below the axis of the arms: 5, spring-seats at the ends of the beam where it joins the arms: 6, clips for securing the springs to these seats: 7, the traction wheels mounted loosely on the axle arms, ball-bearing provision being illustrated: 8, the equalizer casing, of a form suited to receive the equalizer parts and support bearings for them, this casing being rigidly mounted on the beam at the depression of the beam and having its axis coincident with the axis of the axle arms, the casing being horizontally divided at a bolted joint securing the base and cover of the casing together: 9, the equalizer, considered as a whole, its specific type being immaterial to the present invention, this equalizer being mounted in bearings in the equalizer casing and having, as is usual in equalizers, two rotary driven members having a common axis and capable, while receiving power from a single source, of turning at differential speeds: 10, one of the end rotary members of the equalizer, the same being formed with a non-circular axial socket facing outwardly: 11, the other similar end rotary member of the equalizer: 12, the joints of union between the equalizer casing and the beam, these joints being formed by pairs of lugs upon the casing straddling the beam in conjunction with bolts passing through the lugs and beam to firmly unite the equalizer casing to the beam: 13, (see Fig. 6) the spokes of one of the traction wheels, both wheels being alike: 14, the inner flange of the wheel hub: 15, the wheel hub, integral with flange 14 and mounted to turn loosely on the axle arm, the fitting being preferably provided with ball bearings as illustrated: 16, the outer flange of the wheel hub, this flange fitting snugly on the hub and seating against the outer faces of the spokes, the outer hub like extremity of this flange extending outwardly even with the outer end of hub 15: 17, bolts clamping the two hub flanges and the spokes together: 18 (Fig. 11) notches formed in the outer extremities of the inner and outer hub flanges: 19, one of the coupling shafts, there being one for each traction wheel, these shafts having their common axes coincident with that of the axle-arms and equalizer, the inner end of each coupling shaft being fitted into one of the non-circular sockets in the appropriate rotary member of the equalizer, the shaft extending outwardly entirely through the hollow axle-arm: 20, the non-circular inner ends of the coupling shafts where they are socketed into the equalizer: 21, a flange rigidly formed on the outer end of each equalizer, the flange having an outer diameter exceeding that of the inner wheel hub 15: 22, teeth formed on the periphery of the flanges of the coupling shafts and engaging the notches formed at the outer extremity of the wheel hub and outer hub flange: 23, inwardly open sockets at each end of the beam in inward prolongation of the bores of the axle-arms: 24, a socket, preferably of split clamping type as illustrated in Fig. 3, carried by each end of the equalizer casing in the axial line of the general structure: 25, guard tubes loosely encircling the otherwise exposed portions of the coupling shafts, the outer ends of these tubes being fitted into the sockets 23 at the inner ends of the axle-arms and endwise against shoulders therein and their inner ends being tightly but removably secured in the sockets carried by the outer ends of the equalizer casing: 26, brake casings carried by the inner hub flanges of the wheels and having inner cover-disks carried by the inner ends of the axle-arms: 27, a bracket rigidly carried by each end of the beam for the support of brake mechanism, which brake and brake mechanism forms, however, no part of my present invention: 28, brake levers mounted in brackets secured to each end of the beam to coöperate with suitable brake mechanism for which the brake casings 26 provide: 29, the driving shaft having its rear end journaled in the equalizer casing and adapted to be bevel geared to the equalizer as usual: 30, reach-rods having their rear ends coupled to the axle beam: 31, caps removably secured to the outer extremities of the wheel hubs and inclosing the toothed flanges of the coupling shafts and serving to prevent the outward displacement of the shafts: and 32, an inturned flange carried by the inner end of the wheel hub and engaging inwardly behind an outwardly projecting annular part carried at the inner portion of the axle-arm, this projecting annular part, in the preferred and illustrated construction, being formed by the inner ball race rigidly carried by the axle-arm.

The general method of the transmission of the power from the equalizer to the traction wheels is the same as is usual in axles of the floating shaft type, the main parts which support the load being free from the duty of transmitting motion, and the parts which transmit the motion being free from the duty of sustaining the strains of load. The form of beam is well suited for great strength of general structure, but the beam is still further reinforced by the tubes 25, which tubes, in conjunction with the equalizer casing, form a strut above the beam, a trussed structure being thus produced without the addition of parts not having other important offices, the tubes and equalizer casing serving to thoroughly protect the parts against the exit of lubricant or the entrance of dirt. The coupling shafts can be removed outwardly endwise, and, the inner ends of the tubes being unclamped from the equalizer casing they may be shifted inwardly and released from their outer sockets and, upon removing bolts 12, the entire structure between the axle arms may be removed.

In ordinary axles of the floating shaft type having spoked traction wheels, the floating shafts transmit the power to but one side of the spokes only. In the present case, however, the coupling shafts drive equally upon the inner and outer flanges of the spokes as will be manifest from an inspection of Fig. 6, the hubs of inner flanges 14 and outer flanges 16 projecting outwardly so as to both be engaged by the driving disks on the coupling shafts.

The equalizer casing has base-lugs straddling the beam at two separated points, the bolts 12 passing through the lugs and beam, and the equalizer casing has, between each pair of lugs, a seating surface to rest upon the top of the beam. When the structure is assembled the equalizer casing gives rigidity to the beam and at the same time such flexures as may occur in the central portion of the beam are not seriously imposed upon the equalizer casing nor are these strains exerted destructively upon the fastenings uniting the equalizer casing to the beam. Each of the bolts 12 forms a pivot upon which vibrations due to flexure may take place. In assembling the parts, and in taking them apart, the equalizer casing is held in normal place upon the beam even when the bolts are absent, the lug and seat construction preventing displacement of the equalizer casing either vertically or in a fore and aft direction.

I claim:—

1. In a driving axle of floating shaft type, the combination, substantially as set forth, with the depressed beam and the axle arms thereof and the equalizer casing supported by the beam, of guard-tubes having their outer ends in abutting connection with the inner ends of the axle arms and having their inner ends clamped to the outer ends of the equalizer casing, whereby the equalizer casing and tubes form a strut in the axial line of the general structure.

2. In a driving axle of floating shaft type, the combination, substantially as set forth, with the non-rotating beam, and the equalizer supported by the beam, and the coupling shafts projecting from the equalizer out through the axle arms, of a wheel-hub rotatable on each axle arm, a flange rigid with said hub and adapted to engage the inner sides of the wheel spokes, a flange separably carried by said hub and adapted to engage the outer side of the wheel spokes, bolts connecting the two flanges and adapted to serve in clamping the spokes between the flanges, and direct coupling connection between the outer ends of said coupling shafts and the outer portions of said hubs and said separable flanges, whereby the driving strain from the coupling shafts are transmitted independently to said inner and outer flanges.

3. In a driving axle of floating shaft type, the combination, substantially as set forth, with the non-rotating beam, and the equalizer supported by the beam, and the coupling shafts projecting from the equalizer out through the axle arms, of a wheel-hub rotatable on each axle arm, a flange rigid with said hub and adapted to engage the inner sides of the wheel spokes, a flange separably carried by said hub and adapted to engage the outer side of the wheel spokes, bolts connecting the two flanges and adapted to serve in clamping the spokes between the flanges, and toothed disks on the outer ends of the coupling shafts fitted to engage notches in the outer portions of said inner and outer flanges, whereby the teeth of the disks transmit the driving strains independently to the inner and outer flanges.

4. In a driving axle of floating shaft type, the combination, substantially as set forth, of a beam provided with hollow axle arms and depressed at its center and provided with separate horizontal perforations at its depressed portion, an equalizer casing provided at its base with seating portions to rest upon the beam over said perforations, perforated lugs projecting downward from the base of the equalizer casing and straddling the beam at said perforations, bolts extending through the perforations of the lugs and beam, an equalizer mounted in said casing, and coupling shafts extending through the axle arms and having their inner ends flexibly connected with the equalizer.

JOHN A. HERZOG.

Witnesses:
 M. S. BELDEN,
 ELMER R. SHIPLEY.